March 9, 1965 M. H. GROVE 3,172,639
GATE VALVE BODY CONSTRUCTION
Filed June 15, 1962 3 Sheets-Sheet 1

INVENTOR.
Marvin H. Grove.
BY
ATTORNEYS.

March 9, 1965  M. H. GROVE  3,172,639
GATE VALVE BODY CONSTRUCTION
Filed June 15, 1962  3 Sheets-Sheet 2

INVENTOR.
Marvin H. Grove.
BY
Flehr and Swain
ATTORNEYS.

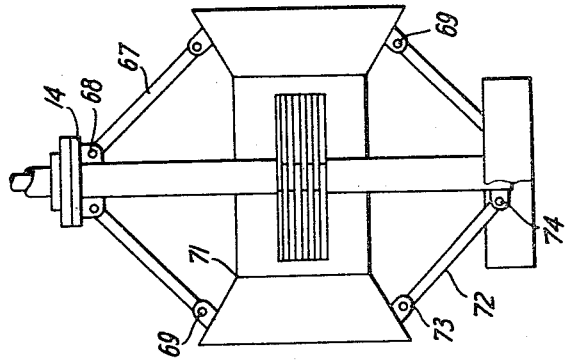
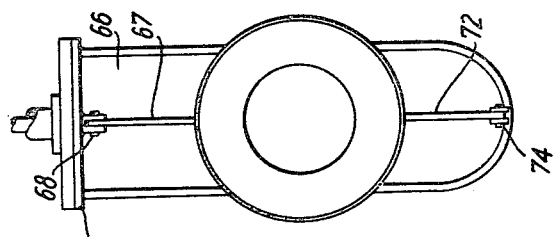
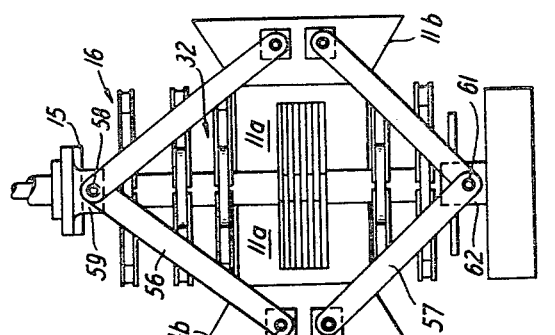
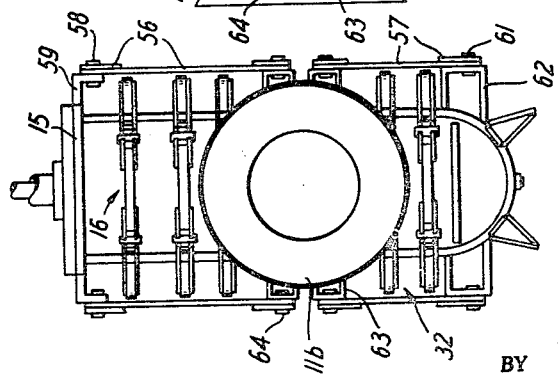

United States Patent Office 3,172,639
Patented Mar. 9, 1965

3,172,639
GATE VALVE BODY CONSTRUCTION
Marvin H. Grove, Piedmont, Calif., assignor to M & J Engineering Co., Houston, Tex., a partnership
Filed June 15, 1962, Ser. No. 202,747
2 Claims. (Cl. 251—329)

This invention relates generally to valves of the gate type for controlling fluid flow.

In the past, fabricated valve bodies have been made by assembling steel plates or other structural steel shapes as by clamping, bolting, welding or the like. Generally the body is rectangular in section with flat end walls having aligned openings forming flow passages. One problem involved in such valves is that when the end body plates are made of mill rolled steel they are subject to deflection under applied line pressure. This is particularly true when such valves are made for the higher working pressures, as for example, pressures of the order of 600 p.s.i. or higher.

In general it is an object of the present invention to provide a novel valve body construction of the fabricated type having novel valve body clamping means which serves to reinforce the end body plates against outward deflection.

A further object of the present invention is to provide reinforcing means for the end body plates which can be applied or removed as desired and which is characterized by being articulated.

Additional objects and features of the invention will appear from the following description in which the preferred embodiments have been shown in detail in conjunction with the accompanying drawing.

Referring to the drawing:

FIGURE 10 is an end elevational view illustrating another embodiment incorporating brace bars.

FIGURE 11 is a side view of the embodiment shown in FIGURE 10.

FIGURE 12 is an end elevational view showing another embodiment using bracing bars.

FIGURE 13 is a side elevational view of the embodiment shown in FIGURE 12.

Figure 2:
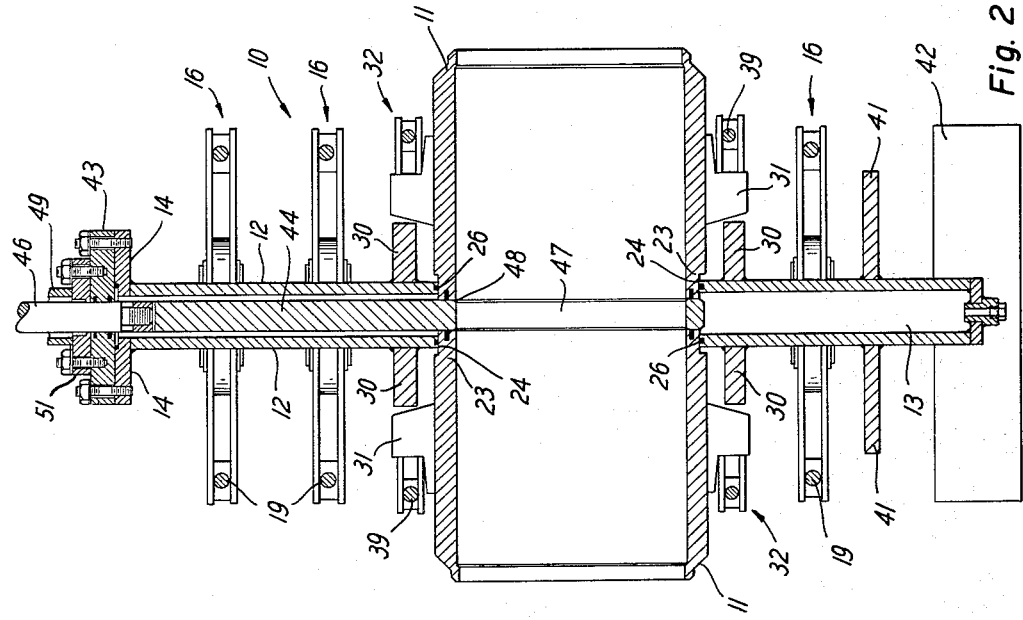
FIGURE 2 is a section in side elevation taken along the line 2—2 of FIGURE 1.
Figure 1:
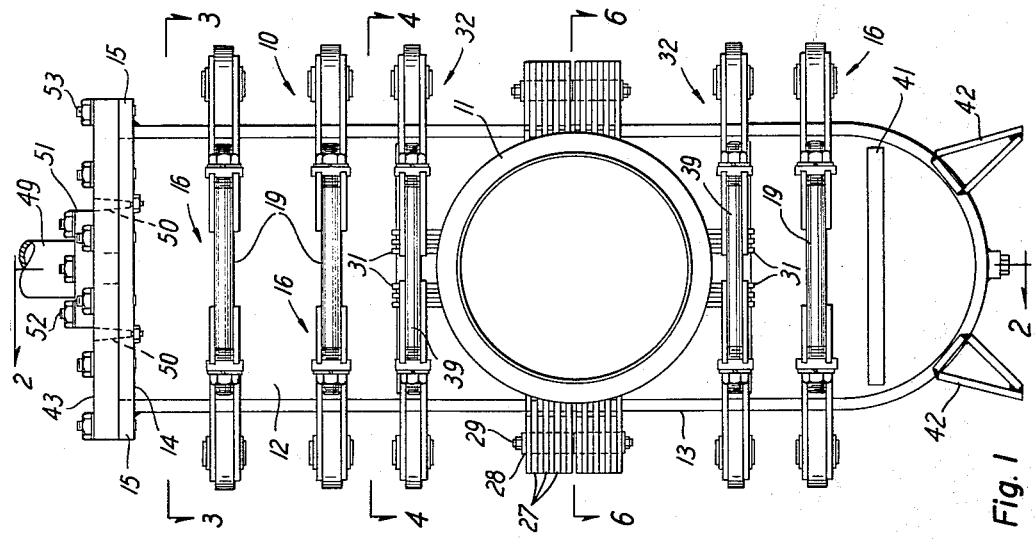
FIGURE 1 is a side elevational view illustrating a gate valve incorporating the present invention.

The valve as shown in FIGURES 1 and 2 of the drawing consists of a body 10 provided with hubs 11 for making connection with associated piping. The body consists of plate-like metal end walls 12, which are joined at their edges to the side walls 13. The side walls can be formed of a single U-shaped metal strip as illustrated, whereby the bottom end of the body is rounded as shown in FIGURE 1.

The bonnet end of the body terminates in a plane at right angles to the length of the body. Here the body is provided with welded-on flanges 14, which extend across the end faces of the body, and which are integral with the side flanges 15.

Figure 3:
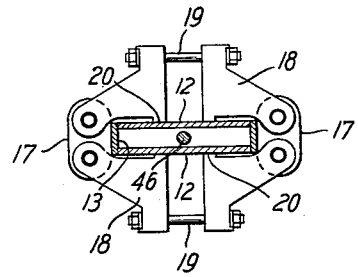
FIGURE 3 is a cross sectional view taken along the line 3—3 of FIGURE 1.

Articulated clamping devices 16 are positioned upon the body and serve to resist outward deflection of the end walls 12. Briefly, each clamping device can consist of side links 17 (FIGURE 3) which are pivotally connected with the lever arms 18. The arms are connected by the adjustable tie rods 19.

Abutment pads 20 on the arms 18 engage the walls 12, and reinforce the walls 12 against outward deflection. The links 17 can be lightly welded to the walls 13, to facilitate assembly operations, and to retain the clamping devices properly positioned.

The hubs 11 preferably are formed as a part of a fabricated hub assembly. Thus each hub can be a suitable forging with the end portions 23 machined to interfit the openings 24 in the body walls 12. Suitable means such as seals 26 of the resilient O-ring type, prevent leakage between the hubs and the body. Along the sides of the valve, each hub is provided with spaced welded on plates 27, and the end portions of these plates are interleaved. These interleaved plate portions are drilled to receive the retaining pins 28, which are connected by the retaining bolts 29.

Figure 4:
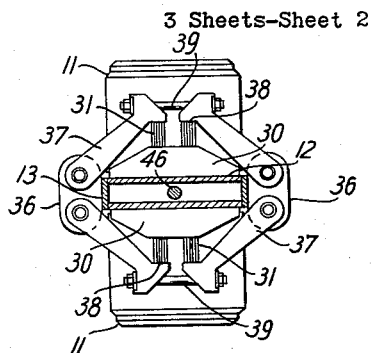
FIGURE 4 is a cross sectional view taken along the line 4—4 of FIGURE 1.

The portions of the walls 12 near the openings 24, are shown reinforced by the welded-on ribs 30. These ribs are located between shoulders 31, which are welded upon the hubs 11, and which in turn are engaged by the clamping devices 32. The clamping devices 32 are shown in detail in FIGURE 4. Each device can consist of side links 36, pivotally connected to the clamping arms 37. The pads 38 on arms 37 engage the shoulders 31. The extremities of the arms 37 are connected by the adjustable tie rods 39.

It will be evident from FIGURE 1 that the two clamping devices 32, located immediately above and below the hubs 11, form a stress taking connection between the hubs, thereby minimizing distortion of the hubs 11 which otherwise would occur if the hubs were connected only by the plates 27. The links 36 may likewise be lightly welded to the body walls 13, to facilitate assembly and to retain the clamping devices 32 in proper position.

The number of clamping devices 16 employed is dedependent somewhat upon the inherent strength of the walls 12, the size of the valve, and the working pressure for which the valve is designed. In the particular arrangement illustrated two clamping devices 16, together with one clamping device 32, are carried by the upper part of the body. The lower part of the body is provided with a single clamping device 16 and one clamping device 32. Below the lowermost clamping device 16, the body is shown provided with welded-on reinforcing ribs 41. Suitable feet 42 are provided at the lower end for holding the body in upright position.

On the bonnet end of the body a mounting plate 43 is positioned upon the flanges 14 and 15, and serves to mount exterior parts for operating the valve. The operating valve parts consist of a flat plate-like valve gate 44, connected to the operating rod 46, and having a port 47 adapted to register with the passages in the hubs 11 for open position of the valve. Suitable valve seating means 48 is shown carried by the inner ends of the hubs for engaging the valve working surfaces of the gate, and may include a seal ring made of resilient material whereby the valve is sealed against line pressure when in closed position.

Figure 7:
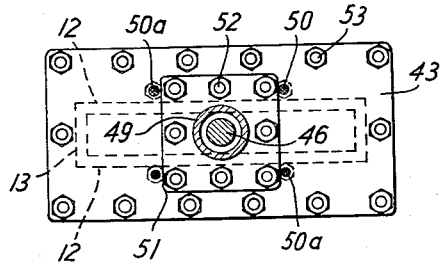
FIGURE 7 is a plan view of the valve body showing one bolting pattern.

The exterior parts illustrated in FIGURES 1 and 2 include the tube or pipe 49, through which the rod 46 extends, and which is carried by the plate 51. Plate 51 is secured to the mounting plate 43 by suitable means, such as the stud bolts 52 (FIG. 7). Plate 43 in turn is attached to the flanges 14 and 15 by the stud bolts 53.

The bolting pattern may be as shown in FIGURE 7. Various types of valve operators may connect with rod 46, such as hand wheel, hand wheel with gear box, electric motor, gas pressure, or hydraulic operators.

Figure 5:
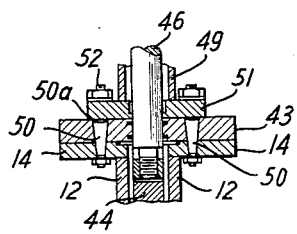
FIGURE 5 is a cross sectional view showing the bonnet end of the body, and the means for transmitting stress forces.

By reference to FIGURE 2 it will be noted that outward forces are exerted upon the upper portions of the end walls 12, by line pressure, are resisted by the flanges 14. If these flanges were made of adequate strength to resist such forces, they would be of excessive weight and size. When made in the proportions illustrated they are inadequate to resist forces of the magnitude ordinarily encountered in valves of this type. The stud bolts 53 tend to resist outward deflection of the flanges 14, but again cannot be relied upon to carry such stresses, because these bolts are not closely fitted, and they are vulnerable to forces applied in shear. In accordance with the present invention, I provide a plurality of dowel pins 50 which serve to transfer such stress forces from the flanges 14 to the mounting plate 43. Aligned holes are provided in the flanges 15 and the mounting plate 43, in which these dowels are closely fitted. As indicated at 50a the upper ends of the dowels may be permanently attached to the mounting plates 43 by welding. The dowels 50 are located intermediate the ends of the flanges 14. As shown in FIGURE 7 such dowels are located upon each side of the plate 43, and generally intermediate the lines of centers of two adjacent bolting holes. It is desirable for these dowels and the holes for accommodating the same to be tapered as illustrated in FIGURE 5. Also it is desirable for the lower ends to be threaded for receiving nuts 50b.

Figure 8:
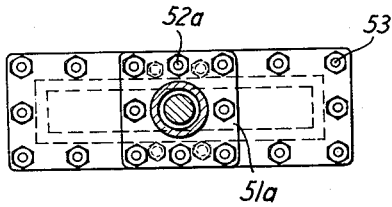
FIGURE 8 is a plan view like FIGURE 7, but showing another bolting pattern.

The bolting pattern shown in FIGURE 8 is somewhat different from the pattern in FIGURE 7, particularly in that the plate 51a is made somewhat wider than plate 51. The stud bolts 52a are made sufficiently long to extend into the flanges 14, and they are located on the same line of centers as the studs 53.

Figure 6:
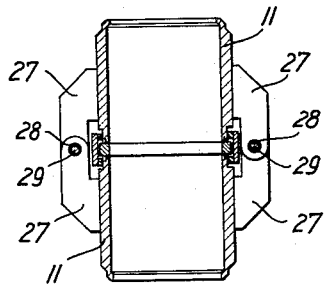
FIGURE 6 is a cross sectional view taken along the line 6—6 of FIGURE 1.
Figure 9:
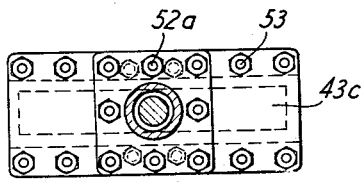
FIGURE 9 is a view like FIGURE 7, but showing a third bolting pattern.

The arrangement shown in FIGURE 9 is similar to that of FIGURE 7, except that the flanges 15 have been omitted, this permits use of a mounting plate 43c which is somewhat shorter than the mounting plate 43 of FIGURE 6.

It will be evident from the foregoing that I have provided a valve of relatively simple construction, and which has novel means for reinforcing a fabricated body against outward deflection of the end walls. The forces on the walls 12 at the bonnet end of the body are adequately carried by the mounting plate 43, without the hazard of possible shearing of the bolting studs. In effect the mounting plate 43 serves to carry means for sealing about the operating rod, to form an end closure for the valve body and for mounting exterior parts, and to carry stress forces applied to the adjacent portions of the body walls 12.

The features described above simplify the construction of fabricated valves, and make possible substantial economies in cost of manufacture.

The above described hub assembly provides a positive direct connection between two sides of the hubs adjacent the sides of the body, and additional ties between the upper and lower portions of the hubs, thus avoiding distortion of the hubs under fluid pressure.

FIGURES 10 and 11 illustrate bracing means for bracing the hub assembly with respect to the body. In this instance brace bars 56 and 57 are provided, and the bars 56 have their upper ends attached by pivotal connections 58 to the rigid brackets 59, the latter being rigidly secured to the flanges 15. The lower ends of bars 57 are attached as by pivotal connections 61 to brackets 62, the latter being fixed to the lower portion of the body.

The hubs 11a in this instance are connected to divergent transition sections 11b. Brackets 63 are attached as by welding to the side portions of the transition sections 11b, and are attached by pins 64 to the corresponding ends of bars 56 and 57.

The bracing means described above prevents relative movement between the hub unit and the body, thereby protecting the body against excess stressing which might otherwise occur in field installations.

FIGURES 12 and 13 illustrate another embodiment wherein a simplified bracing is provided between the hub unit and the body. The valve body 66 in this instance is intended for lower operating pressures and, therefore, the clamp-on devices 16 and 32 are omitted. The brace bars 67 have their upper ends secured at 68 to the flange 14, and the lower ends attached at 69 to the ends of the hubs 71. The lower portion of the body and the brace bars 72 are similarly attached at 73 to the hub 71, and to the lower end of the body at 74. Here again, the brace bars 67 and 72 serve to provide bracing means between the hub unit and the body.

This application is a continuation-in-part of my copending applications Ser. No. 131,802, filed August 16, 1961, for "Valve Construction," and Ser. No. 149,648, filed November 2, 1961, filed November 2, 1961, for "Valve Construction."

I claim:

1. In a valve construction, a valve body comprising plate-like end walls joined at their edges by side walls, a hub assembly comprising two aligned hubs having their adjacent end portions fitted into openings in the end walls, the body having portions extending from both the upper and lower sides of the hub assembly, means forming direct tie connections between the side portions of the aligned hubs, and articulated means embracing the upper and lower portions of the body and forming connections between upper and lower portions of the aligned hubs and the upper and lower extending portions of the body.

2. In a valve construction, a valve body comprising plate-like end walls joined at their edges by side walls, and articulated clamping devices embracing the body and serving to reinforce the end walls against outward deflection, each clamping device comprising two pairs of lever arms having portions engaging the end walls, links disposed alongside the side walls and connecting the lever arms, and members adjustably connecting the lever arms of each pair.

References Cited by the Examiner

UNITED STATES PATENTS

| | | | |
|---|---|---|---|
| 2,131,053 | 9/38 | Kinzie et al. | 251—327 XR |
| 2,904,306 | 9/59 | Bryant | 251—367 |
| 2,957,492 | 10/60 | Volpin | 251—327 XR |
| 3,013,770 | 12/61 | Anderson et al. | 251—329 |
| 3,071,342 | 1/63 | Allen | 251—328 XR |

FOREIGN PATENTS

| | | |
|---|---|---|
| 984,464 | 2/51 | France. |

M. CARY NELSON, *Primary Examiner.*

M. KAUFMAN, *Examiner.*